United States Patent [19]

Kadkhodayan et al.

[11] Patent Number: 5,403,960
[45] Date of Patent: Apr. 4, 1995

[54] PROCESS FOR SULFURIZED OLEFINIC PRODUCT

[75] Inventors: Abbas Kadkhodayan; Paul G. Griffin, both of Collinsville, Ill.

[73] Assignee: Ethyl Petroleum Additives, Inc., Richmond, Va.

[21] Appl. No.: 125,223

[22] Filed: Sep. 23, 1993

Related U.S. Application Data

[63] Continuation-in-part of Ser. No. 940,615, Sep. 4, 1992, abandoned, which is a continuation-in-part of Ser. No. 739,092, Aug. 1, 1991, abandoned.

[51] Int. Cl.$^6$ ............................................. C07C 321/14
[52] U.S. Cl. ..................................................... 568/21
[58] Field of Search ......................................... 568/21

[56] References Cited

U.S. PATENT DOCUMENTS

| | | | |
|---|---|---|---|
| 2,312,750 | 3/1943 | Cohen | 252/48 |
| 2,337,473 | 12/1943 | Knowles et al. | 260/139 |
| 2,497,138 | 2/1950 | Rogers | 260/139 |
| 2,708,199 | 5/1955 | Eby | 260/327 |
| 2,718,501 | 9/1955 | Harle | 252/47 |
| 3,221,056 | 11/1965 | Louthan | 260/583 |
| 3,471,404 | 10/1969 | Myers | 252/45 |
| 3,600,327 | 8/1971 | Hu | 252/32.7 |
| 4,204,969 | 5/1980 | Papay et al. | 252/45 |
| 4,645,610 | 2/1987 | Born et al. | 252/45 |
| 4,904,402 | 2/1990 | Audeh | 252/46.3 |
| 4,954,274 | 9/1990 | Zaweski et al. | 252/45 |
| 4,966,720 | 10/1990 | DeGonia et al. | 252/45 |

FOREIGN PATENT DOCUMENTS 0293299 11/1988 European Pat. Off.
1308894 3/1973 United Kingdom.

*Primary Examiner*—Johann Richter
*Assistant Examiner*—John D. Peabody, III
*Attorney, Agent, or Firm*—John F. Sieberth

[57] ABSTRACT

A process for preparing, in high yield, a sulfurized olefinic product for use in lubricating oil compositions having a chlorine content of less than about 1000 ppm, a sulfur content of from about 40 to about 50 weight percent and a viscosity at 100° C. of within the range of from about 5 to about 15 cSt.

12 Claims, No Drawings

PROCESS FOR SULFURIZED OLEFINIC PRODUCT

This application is a continuation-in-part of patent application Ser. No. 07/940,615, filed Sep. 4, 1992, now abandoned, which in turn is a continuation-in-part of patent application Ser. No. 07/739,092, filed Aug. 1, 1991, now abandoned.

BACKGROUND

This invention relates to a process for preparing, in high yield, a sulfurized olefinic product for use in lubricating oil compositions having a low chlorine content, a sulfur content of from about 40 to about 50 weight percent and a viscosity at 100° C. of less than about 20 cSt.

A number of methods for the preparation of sulfurized olefinic products that can be used as additives for lubricants are described in the prior art.

Myers, U.S. Pat. No. 3,471,404, describes a process for the preparation of stable non-corrosive organosulfur compounds which are substantially monomeric. The monomeric organosulfur compounds are prepared by reacting the adduct formed from the reaction between an olefin and sulfur monochloride with an alkali metal sulfide and free sulfur in the presence of an alcohol or an alcohol-water solvent under reflux conditions. Subsequently, the polysulfurized olefin is contacted with an inorganic base in a water solution to remove chlorine to less than about 0.5 weight percent.

Papay, et al., U.S. Pat. No. 4,204,969, describe a method for the preparation of olefin polysulfides comprising the steps of reacting sulfur monochloride with a $C_3$-$C_6$ aliphatic mono-olefin in the presence of a promoter consisting of a lower alcohol (preferably isopropanol) in order to form an adduct. The adduct is then reacted with sulfur or sodium sulfide in a ratio of 0.1 to 0.4 gram-atom of sulfur per mole of sodium sulfide in an aqueous alcoholic medium at a temperature ranging from 50° C. to the reflux temperature. The mixture is held at reflux for 2-8 hours to assure complete reaction. After the reflux period, the alcohol is distilled from the mixture and the product recovered by conventional methods.

In addition, Borne, et al., U.S. Pat. No. 4,645,610, disclose a method for the preparation of olefin polysulfides comprising contacting an addition product produced by the reaction of at least one aliphatic monoolefin containing 2 to 5 carbon atoms and sulfur monochloride or dichloride with a hydrocarbyl halide and at least one sulfur compound selected from sulfides, hydrosulfides and polysulfides of alkali metals, ammonium or alkaline-earth metals and usually elemental sulfur in an aqueous or aqueous alcoholic medium at certain reaction conditions so as to obtain products whose kinematic viscosity is not too high. When an alcoholic reaction medium is used, the preferred alcohol is isopropanol. If necessary, the product is treated with an inorganic base subsequent to the formation reaction. The product thus obtained has a viscosity of about 4 to 20 $mm^2/s$ and a halogen content of less than 1 weight percent.

Zaweski, et al., U.S. Pat. No. 4,954,274, describe a process for obtaining sulfurized olefinic compounds which are soluble in both mineral and synthetic oils of lubrication viscosity. The first stage of the process is conducted by adding an olefin to sulfur monochloride in the presence of minor amounts of an active Lewis acid to form an adduct. The adduct from the first stage of the process is then reacted with sodium sulfide and sulfur in an aqueous alkanol reaction medium (preferably isopropanol) at a temperature of about 50° C. up to reflux. After reaction of the adduct with sodium sulfide and sulfur, the product is recovered by conventional methods such as removing alkanol, water washing, vacuum drying and filtering.

DeGonia, et al., U.S. Pat. No. 4,966,720, relate to sulfurized olefins useful as EP additives in lubrication oils and to a two-stage process for their preparation. In the second stage of the process a sulfur monochloride/aliphatic monoolefin adduct is reacted in a basic, aqueous alcoholic solution containing sodium sulfide at a temperature of from about 50° C. up to reflux to form the sulfurized olefin. When using the preferred alcohol, isopropanol either alone or mixed with other alkanols such as tertbutanol, and a reaction temperature of preferably 75° to 85° C., the resulting sulfurized polyalkylene product of DeGonia, et al., typically contains more than 5000 ppm chlorine.

British Patent 1,308,894 describes a process for producing organic sulfides of high sulfur content utilizing a catalytic quantity of a lower aliphatic alcohol to form a sulfo-halogenated organic intermediate, and thereafter sulfurizing and dehalogenating the intermediate in the presence of a substantial quantity of a lower aliphatic alcohol by treatment with an aqueous alkali metal monosulfide solutions. For chlorine contents of less than 4000 ppm, British Patent '894 notes that short reaction times are considered important in the production of low viscosity products.

While the foregoing methods provide sulfurized olefin products which are useful in lubricant mixtures, the chlorine content of the products of the foregoing processes is generally above about 1000 ppm and often above 5000 ppm. There remains a need for a sulfurized olefinic product having a substantially lower chlorine content yet containing the amount of sulfur desired and having acceptable copper corrosion and viscosity characteristics.

THE INVENTION

It has now been discovered that a sulfurized olefinic product, having a chlorine content of less than about 2000 ppm, preferably less than about 1000 ppm, and most preferably less than about 500 ppm and containing more than about 30 weight percent sulfur, preferably more than 35 weight percent sulfur and most preferably more than 40 weight percent sulfur, can be prepared by contacting an adduct of a sulfur halide and an olefin with a sulfur source in an alkaline reaction medium comprising, a base, a catalytic amount of dehalogenation catalyst, and a lower alkanol, which alkanol has a boiling point of greater than about 85° C.; maintaining the so contacted adduct at a temperature and for a period of time which are sufficient to form a mixture containing alcohol, base, and a sulfurized olefinic product; and heating the mixture thus formed for a period of time and at a temperature and pressure sufficient to form, in high yield, the sulfurized olefinic product having a chlorine content of less than about 2000 ppm.

Heretofore, sulfurized olefinic product has been made by a process which, although effective in obtaining a product with the desired sulfur content, usually had a chlorine content of 4000 ppm or more. It has been discovered surprisingly, and quite unexpectedly, that utilizing a reaction medium containing an alcohol having a boiling point above a particular temperature during the dehalogenation reaction of the sulfurized olefinic product makes a substantial difference in the amount of chlorine in the recovered sulfurized olefinic product. It has been further discovered that utilization of a particular dehalogenation catalyst during the dehalogenation reaction can greatly enhance the removal of chlorine from the sulfurized olefinic product without adversely affecting the viscosity or yield of product thus obtained. Accordingly, the use of an alcohol or mixture of alcohols having a boiling point of greater than about 85° C. and a certain catalyst during the dehalogenation reaction step are key features of this invention.

High yield of sulfurized olefin means greater than about 50 percent yield based on theoretical. For example, if about 500 grams of adduct are charged to a reaction vessel, more than about 250 grams of sulfurized olefinic product having a chlorine content of less than about 2000 ppm are obtained.

The process of this invention also provides a sulfurized olefinic product having an acceptable viscosity. Oftentimes, when a sulfurized olefinic product is post-treated using prior art techniques to reduce the chlorine content, the viscosity of the thus treated product tends to increase due to polymerization of the sulfurized olefinic product. With more severe dehalogenation conditions, the sulfurized olefinic product may crack or decompose thus significantly reducing the yield of product obtained. The foregoing disadvantages are overcome by the present invention which has been found to provide a product in high yield with a low viscosity despite the low chlorine content of the product thus obtained. Other advantages of the invention will be evident from the ensuing description.

Particularly preferred sulfurized olefinic products of this invention have viscosities at 100° C. of less than about 20 cSt, preferably less than about 15 cSt, and most preferably in a range of from about 2 cSt to about 12 cSt, a chlorine content within the range of from about 50 to about 500 ppm, and a sulfur content within the range of from about 40 to about 50 wt. %.

In another embodiment, this invention provides a sulfurized olefinic lubrication oil additive which imparts extreme pressure properties, having a chlorine content of less than about 500 ppm and made by a process comprising contacting an adduct of (i) a sulfur halide and (ii) an olefin with a sulfur source in an alcoholic alkaline reaction medium comprising base, dehalogenation catalyst, and a lower alkanol, the alkanol having a boiling point greater than 85° C.; maintaining the so contacted adduct at a temperature and for a period of time which are sufficient to form a mixture containing alcohol, base, and a sulfurized olefinic product; and heating the mixture for a period of time and at a pressure sufficient to form, in high yield, the sulfurized olefinic product having a chlorine content of less than about 500 ppm and a viscosity within the range of from about 5 to about 15 cSt at 100° C.

In yet another embodiment, this invention provides a process for preparing a sulfurized olefin having a chlorine content of less than about 1,000 ppm and a viscosity at 100° C. of less than about 15 cSt, the process comprising contacting an adduct of a sulfur halide and an olefin with a sulfur source in an alcoholic alkaline reaction medium containing a catalytic amount of dehalogenation catalyst; maintaining the so-contacted reaction product at a temperature and for a period of time which are sufficient to form a mixture containing alcohol, base, and sulfurized olefin; and heating the mixture for a period of time and at a pressure sufficient to form the sulfurized olefinic product having a chlorine content of less than about 1,000 ppm and a viscosity at 100° C. within the range of from about 5 to about 15 cSt.

In accordance with the invention, the starting olefins are the monoethylenically unsaturated aliphatic hydrocarbons referred to as aliphatic monoolefins containing 3 to about 6 carbon atoms. These include 1-butene, 2-butene, isobutene, 1-pentene, 2-pentene, 2-methyl-1-butene, 3-methyl-1-butene, 2-methyl-2-butene, 1-hexene, 2-hexene, 3-hexene, 2-methyl-1-pentene, 2-methyl-2-pentene, 2-ethyl-2-butene and the like including mixtures thereof.

Preferably, the olefins are branched chain olefins such as isobutene, 2-methyl-1-butene, 1-methyl-2-butene, 2-methyl-2-pentene and the like. More preferably, the ethylenically double bond adjoins a tertiary carbon atom such as isobutylene, the most preferred olefin.

The adduct of sulfur halide and olefin is preferably formed by adding olefin to a sulfur monochloride. The olefin can be added as a gas or liquid. Preferably, the olefin is added beneath the surface of the sulfur monochloride as a gas.

In practice, the olefin is added until the reaction with the sulfur monochloride stops as indicated by loss of exotherm. An amount of about 0.45–2.0 gram moles of olefin per each 0.3–0.75 gram moles of sulfur monochloride usually suffices. A preferred amount is about 1.7–2.2 grams moles of olefin per gram mole of sulfur monochloride.

Preferably, the adduct of olefin and sulfur monochloride is formed without adding an alkanol promoter, but the use of an alkanol promoter may be used if so desired. When used, the alkanol promoter is typically a lower alkanol having from about 1 to about 4 carbon atoms such as methanol, ethanol, n-propanol, isopropanol, isobutanol, tert-butanol and the like. The most preferred promoter is methanol.

The lower alkanol promoter, when used, can be added to the sulfur monochloride initially; the alkanol promotor can be added to the reaction mixture continuously or periodically during the course of olefin addition; or the alkanol promotor can be premixed with the olefin and added as a mixture of alkanol promoter and olefin to the sulfur monochloride. Of the foregoing, the more preferred modes of addition are to either add the entire amount of alkanol promoter initially and then add the olefin or to concurrently add both alkanol promoter and olefin to the sulfur monochloride.

The amount of alkanol promoter used is typically in a range of from about 0,001 to about 0.3 gram moles for each 0.3–0.75 gram mole of sulfur monochloride. More or less alkanol promoter can be used, and such amounts can be determined by simple trial and error techniques.

The adduct forming step can be conducted at any temperature high enough to cause the reaction to proceed, but not so high as to cause decomposition of the reactants or products. A useful range is about −30° to 100° C. A more preferred range is about −20° to 75° C. and a most preferred range is about 0° to 20° C. for lower viscosity products and 20° to 60° C. for higher viscosity products. The lower viscosity products are preferred and tend to be more soluble than the higher viscosity products in some lubricant formulations while in other formulations, higher viscosity products are preferred, hence there is a need for a process which is flexible enough to produce either high or low viscosity products.

The adduct forming step should be conducted for a time sufficient to complete the reaction between the sulfur monochloride and olefin. This is usually limited by heat removal. Olefin feed rate is preferably controlled to hold the temperature within the desired range. When the sulfur monochloride has been consumed, the temperature will drop. External heat may be added to continue the reaction for a further time, but this does not appear to be necessary. The overall time required to complete the reaction depends upon the scale of the processing and can vary from a few minutes up to 12 hours or more. Time is not a critical parameter in the adduct forming stage of the reaction.

During the adduct forming step, HCl gas is evolved so means should be provided to scrub the vent gas from the reactor to remove HCl prior to releasing it from the atmosphere.

After forming the adduct, the adduct is contacted with a sulfur source in an alkaline reaction medium containing a lower alkanol having a boiling point of greater than about 85° C., a dehalogenation catalyst, and a base. The sulfur source may be elemental sulfur, NaHS, $Na_2S$, $Ag_2S$, $Bi_2S_3$, CuS, $Cu_2S$, $H_2S$, MnS, SnS, and the like. Preferably, the sulfur source is provided by elemental sulfur or NaHS and most preferably by a mixture of elemental sulfur and NaHS. Optionally, if hydrogen sulfide is available, it can be adsorbed in aqueous NaOH or KOH to form a solution of sodium or potassium sulfide and/or sodium or potassium hydrosulfide, depending upon the amount of hydrogen sulfide adsorbed.

The amount of total sulfur in the aqueous alkaline reaction medium is critical in obtaining the desired sulfurized olefinic product having a sulfur content of more than about 30 weight percent. Hence the aqueous alkaline medium should contain more than about 1 mole of total sulfur per mole of adduct, more preferably more than about 1.4 moles of total sulfur per mole of adduct and most preferably in the range of from about 1.5 to about 1.7 moles of total sulfur per mole of adduct. In a particularly preferred embodiment, the ratio of the gram atoms of elemental sulfur to moles of NaHS is in the range of from about 0.01:1 to about 0.25:1, preferably from about 0.04:1 to about 0.2:1 and most preferably from about 0.08:1 to about 0.10:1. With regard to the amount of adduct charged to the reaction vessel, the most preferred molar ratio of NaHS to adduct is in the range of from about 1.3:1 to about 1.5:1; and the most preferred ratio of S to adduct is in the range of from about 0.05:1 to about 0.3:1 gram atoms of S per mole of adduct.

When NaHS and elemental sulfur are used as the sulfur source, the reaction medium further comprises an alcoholic basic solution, typically a metal hydroxide or alkaline earth metal hydroxide selected from KOH, NaOH, LiOH, $Mg(OH)_2$, $Ca(OH)_2$, and the like, preferably KOH or NaOH. In a particularly preferred embodiment, the reaction medium comprises more than about 0.01 moles of KOH per mole of adduct, preferably more than about 0.05 moles of KOH per mole of adduct, and most preferably in the range of from about 0.06 to about 0.3 moles of KOH per mole of adduct.

One key feature of the dehalogenation step of this invention is the use of an alkanol having a boiling point of greater than about 85° C. in the reaction mixture for preparing the sulfurized olefinic product. Preferably, the alcohol is a lower alcohol containing 1–4 carbon atoms such as n-propanol, n-butanol, isobutanol, tert-butanol and the like including mixtures thereof. The preferred alkanol is n-propanol either alone or mixed with other alkanols such as tert-butanol.

The amount of alkanol can vary over a wide range. A useful range is about 0.1–0.8 parts by weight per each part by weight of adduct. A more preferred range is about 0.15–0.65 parts by weight per each part of adduct.

The alcohol employed in the invention can either be a virgin alcohol or a mixture of virgin alcohols and recycle alcohols obtained as a distillate from a previous sulfurization reaction. In a preferred embodiment, the alcohol is essentially pure n-propanol; however, a mixture of n-propanol and tertbutanol may also be used. When used, the mixture of alcohols typically contains 85–95 weight percent n-propanol and 5–15 weight percent tert-butanol. When a mixture is used, it is critical that there be substantially more n-propanol than t-butanol. Suitable mixtures of alcohols may be available typically as a recycle stream of n-propanol containing about 10 weight percent t-butanol.

Another key feature of the invention is the use of dehalogenation catalyst. Useful catalyst may be selected from high surface area material such as silica; alumina which can be activated, unactivated, basic, neutral, or acidic; smectite clays such as montmorillonite, volkhonskoite, pimelite, beidellite, nontronite, saponite, sauconite or hectorite; modified clays; modified natural or synthetic zeolites such as mordenite, and X, Y, and A zeolites; and any inorganic oxide such as $TiO_2$. In a particularly preferred embodiment, the catalyst is unactivated, basic alumina.

The amount of catalyst should be a catalytic amount. Suitable catalytic amounts range from 0.005 parts per part of adduct to 0.08 parts per part of adduct, more preferably from about 0.008 to about 0.05 parts per part of adduct, and most preferably from about 0.01 to about 0.04 parts per part of adduct.

The catalyst may be a single dehalogenation catalyst or a combination of two or more of the foregoing dehalogenation catalysts. Optionally, the dehalogenation reaction can be conducted in the presence of polyalkylene glycol co-catalyst. Suitable polyalkylene glycols are the polyalkylene glycols having $C_1$–$C_4$ alkyl groups and having a number average molecular weight ranging from about 250 to about 350. Most preferred in polyethylene glycol having a number average molecular weight of about 300.

Like the dehalogenation catalyst, the amount of the polyalkylene glycol co-catalyst used in the dehalogenation reaction is a catalytic amount. Accordingly, the polyalkylene glycol is typically present in an amount ranging from 0.01 part per part of adduct to 0.16 parts per part of adduct, more preferably from about 0.016 to about 0.10 part per part of adduct, and most preferably from about 0.018 to about 0.05 parts per part of adduct.

In addition to the alkanol, sulfur source, catalyst, and optional polyalkylene glycol, the alkaline reaction medium may optionally contain an amount of water sufficient to form an aqueous alkaline medium. Typically, the total amount of water in the reaction medium is, on a weight basis, substantially equal to the amount of adduct added to the aqueous medium. The water may be added with the sulfur source, the metal hydroxide or the alkaline earth metal hydroxide, the alkanol, or any combination of two or all three of the foregoing. Optionally, free water may be added to the alkaline medium taking into account the amount of water entering the alkaline medium from any of the foregoing sources.

The presence or absence of water in the reaction medium is not critical to the invention. In a particularly preferred embodiment, the dehalogenation reaction is conducted under essentially anhydrous conditions. Accordingly, all reactants and catalysts thus used are essentially water free, e.g., they contain less than 1 weight percent water.

The sequence of addition of the sulfur source, alkanol, dehalogenation catalyst, and co-catalyst to the alkaline reaction medium is not critical to the invention. Hence, each of the foregoing may be added in any order or in any combination. The adduct, however, is preferably added after forming the alkaline reaction medium containing the sulfur source, alkanol, catalyst, and optional co-catalyst.

It may also be desirable to add an anti-foaming agent to the reaction medium prior to, during, or after the addition of the adduct. When it is desirable to add such an antifoam agent the antifoam agent thus selected should be compatible with the reaction medium and product formed. Hence, any of the well known antifoam agents may be used. It has been found that antifoam B (Dow Corning Company) is particularly suitable for use as an antifoam agent in the process of this invention.

Prior to addition of the adduct, the alkaline reaction medium is typically heated to above about 50° C., preferably above 60° C., most preferably about 70° C. When the reaction medium reaches the desired temperature, the adduct is added with agitation over an extended period of time. The agitation rate for the medium is not critical to the invention as long as the agitation rate is sufficient to maintain the components of the reaction medium and adduct in suspension so that there is sufficient contact between the adduct, catalyst, and the sulfur source. Depending on the batch size, the period of time for adduct addition may be up to about 10 hours or more. It is particularly preferred, however, to add the adduct at a constant rate over a period of about 2-4 hours. The rate of addition of the adduct is not critical as long as the adduct is added to the medium over a period of at least about 2 hours. During the addition of the adduct, the temperature of the medium will rise from about 70° C. to reflux. The rate of addition of the adduct is dependent on the ability of the equipment to maintain the temperature at reflux during the adduct addition.

Subsequent to the addition of the adduct to the reaction medium, the resulting mixture is maintained at an elevated temperature for a period of time (cook period) sufficient to form the sulfurized olefinic product having a low chlorine content. It is particularly preferred that the resulting reaction mixture be maintained at reflux for more than about 1.5 hours to assure adequate contact between the adduct and the sulfur source. The period of time the mixture is maintained at the elevated temperature is most preferably about 2-4 hours or longer.

After the cook period, the temperature of the mixture is increased to effectively strip the alkanol from the reaction mixture thus formed. The temperature required to strip the alcohol from the reaction mixture is dependent on the particular alcohol selected and the pressure utilized in the stripping operation. It is highly desirable that the alcohol be stripped under vacuum at a temperature in the range of from about 85° C. to about 100° C. and most preferably about 90° to 95° C. During the stripping operation a subatmospheric pressure may be applied and the stripping operation continued until the pressure reaches about 20-23 inches Hg vacuum. Once a vacuum of about 23 inches of mercury is obtained, the vacuum source is cut off and an amount of water is added with agitation to the stripped mixture. Upon termination of the agitation, a separate aqueous phase thus forms. The amount of water added to form the aqueous phase is in the range of from about 60 to about 100 wt. % of the weight of adduct initially charged.

Subsequent to the water addition and agitation for about 10 to 30 minutes, the agitation is terminated and the reaction medium is allowed to settle in order to form two phases, an aqueous phase containing water and chloride salts; and an organic phase containing the sulfurized olefinic product and a minor amount of alcohol and water. Once the organic and aqueous phases are formed, the aqueous phase is separated from the organic phase by decantation or other mechanical means, and the organic phase is heated to remove residual water and alcohol. Typically the organic phase is heated to a temperature in the range of from about 100° to about 120° C. and under a reduced pressure of about 20-28 inches of Hg for about 10 minutes to about an hour. The product is then recovered by conventional methods such as filtration, centrifugation, and the like.

While the foregoing description contemplates that the adduct forming reaction and the dehalogenation reaction are performed without first isolating the adduct from the first reaction mass, it is to be understood that the dehalogenation step for forming the sulfurized olefinic product can be performed in a separate post-treatment reaction. Accordingly, sulfurized olefinic product made by any of the foregoing prior art techniques may be dehalogenated by post-treating the product in the presence of a lower alkanol, dehalogenation catalyst, base, and sulfur source for a period of time sufficient to form the desired low chlorine sulfurized olefinic product.

The exact structure of the sulfurized olefinic product is not known, but it is believed to be a polymeric product containing alkylene sulfur bridged structures.

The following examples are presented to illustrate various aspects of the invention and are not to be considered as limiting any aspect thereof.

EXAMPLE 1

Addition of Sulfur Monochloride to Isobutylene

Liquid sulfur monochloride, (135.0 grams), was charged into a suitable reaction flask equipped with a stirrer, thermometer, a condenser maintained at 5° C. and a sub-surface gas sparger. Thereafter, gaseous isobutylene was bubbled into the reaction flask below the surface of the sulfur monochloride liquid while stirring to bring the temperature up to about 55° C. A total of 187.9 grams of isobutylene was added. The adduct thus formed was a clear amber oil.

Example 2, and 3 are presented for comparative purposes. In Examples 2 and 3, the alcohol or mixture of alcohols utilized in the dehalogenation step had a boiling point of less than about 85° C. The dehalogenation reaction of Examples 2 and 3 is conducted under aqueous condition.

EXAMPLE 2

Preparation of Sulfurized Isobutlylene

A reaction flask is charged with 108.4 grams of water, 3.6 grams of elemental sulfur, ½ a dropper of antifoam B, 368.0 grams isopropanol, 150.2 grams of 50 weight percent aqueous sodium hydroxide, and 393.3 grams of 35 weight percent aqueous NaHS. The mixture is stirred and heated under nitrogen to 70° C. at which time 513 grams of the isobutylene-sulfur monochloride adduct of Example 1 is added subsurface over a 4 hour period while maintaining the reaction mass at reflux (76°–84° C.). Heat is continued at reflux for two hours and then the alcohol is stripped out by heating up to 90° C. at atmospheric pressure. Following the atmospheric strip, the pressure is reduced to 23 inches of Hg while allowing the flask to cool to about 72° C. to complete the removal of the alcohol and most of the water. To the resulting product is added 300 grams of water which, after stirring for 10 minutes is allowed to settle for 5 minutes. The lower aqueous brine layer is separated and the organic layer is vacuum stripped (28 inches Hg) at 100° C. After filtering the stripped organic layer through a bed of diatomaceous earth, a clear yellow oil is obtained. Analysis of product made by the foregoing procedure typically has a viscosity in the range of 7.0 to 8.0 cSt at 100° C., a sulfur content of about 44–47 weight percent, chlorine content of about 0.7–0.75 weight percent and a copper corrosion test weight loss (CCT) of about 35–85 milligrams per 100 mL of sample.

EXAMPLE 3

Preparation of Sulfurized Isobutylene

A reaction flask equipped with an agitator was charged with 49.4 grams of water (2.74 moles) which was heated to about 20° C., 8.5 grams of elemental sulfur (0.26 moles), 242.2 grams of reagent grade isopropanol, 22.8 grams of reagent grade t-butanol, 143.2 grams of 50 weight percent aqueous sodium hydroxide (1.79 moles NaOH), and 437 grams of 34 weight percent aqueous NaHS (2.64 moles of NaHS). About ½ drop of defoamer was also included in the initial charge. The mixture was stirred at 700 rpm and heated under nitrogen to 50° C. at which time 500 grams of the isobutylene-sulfur monochloride adduct of Example 1 having a mole ratio of isobutylene to sulfur monochloride of 1.85 was added subsurface over a 2 and ½ hour period with the reaction mixture being allowed to exotherm to about 70° C. and then the reaction mass was maintained at about 78° C. at atmospheric pressure until the adduct addition was complete. The reaction mass was then heated to alcohol reflux temperature (82° C.) and refluxed for about 3 hours. The H₂S evolved was removed by caustic scrubbing. After reflux, the alcohol was stripped at atmospheric pressure by heating up to 90° C. Following the atmospheric strip, the pressure was reduced to 23 inches of Hg to complete the removal of the alcohol and most of the water. To the resulting product was added 625 grams of water with stirring and heating to 60° to 65° C. in order to wash the organic layer after which agitation and heating was stopped and the mixture separated into an organic phase and a brine layer. The lower aqueous brine layer was separated and the organic layer was vacuum stripped of water containing residual sulfur at 100 mm Hg and 100°–100° C. After filtering the stripped organic layer through a bed of diatomaceous earth, a clear yellow oil was obtained. Product made by the foregoing procedure had a viscosity of 6.88 cSt at 100° C., a sulfur content of about 43.7 weight percent, chlorine content of 2300 ppm and a CCT of about 37.5 milligrams per 100 mL of sample.

In the next Examples 4, 5 and 6, the advantage of utilizing an aqueous reaction medium containing an alcohol or mixture of alcohols having a boiling point of greater than about 85° C. during the dehalogenation step is illustrated.

EXAMPLE 4

Preparation of Sulfurized Isobutylene

A reaction flask is charged with 173.7 grams of water, 8.4 grams of elemental sulfur, ½ a dropper of antifoam B, 261.0 grams of reagent grade n-propanol, 29.0 grams of reagent grade t-butanol, 143.4 grams of 50 weight percent aqueous sodium hydroxide, and 409.3 grams of 35 weight percent aqueous NaHS. The mixture is stirred at 700 rpm and heated under nitrogen to 70° C. at which time 503.7 grams of the isobutylene-sulfur monochloride adduct of Example 1 is added subsurface over a 2 hour period while maintaining the reaction mass at reflux (92°–94° C.). Heat is continued at reflux for four hours and then the alcohol is stripped out by heating up to 100° C. at atmospheric pressure. Following the atmospheric strip, the pressure is reduced to 23 inches of Hg while allowing the flask to cool to about 72° C. to complete the removal of the alcohol and most of the water. To the resulting product is added 300 grams of water which, after stirring for 10 minutes is allowed to settle for 5 minutes. The lower aqueous brine layer is separated and the organic layer is vacuum stripped (28 inches Hg) at 100° C. After filtering the stripped organic layer through a bed of diato-maceous earth, a clear yellow oil weighing 315.8 grams was obtained. Analysis of a product made by the foregoing procedure had a viscosity of 7.8 cSt at 100° C., a sulfur content of about 45.8 weight percent, chlorine content of 500 ppm and a copper corrosion test result (CCT) of about 45.1 milligrams per 100 mL of sample.

EXAMPLE 5

Preparation of Sulfurized Isobutylene

Sulfurized isobutylene was made by the procedure of Example 4. After filtering the stripped organic layer through a bed of diatomaceous earth, a clear reddish-yellow oil weighing 318.3 grams was obtained. Analysis of a product made by the foregoing procedure has a viscosity of 8.3 cSt at 100° C., a sulfur content of about 45.8 weight percent, chlorine content of 700 ppm and a CCT of about 42.9 milligrams per 100 mL of sample.

EXAMPLE 6

Preparation of Sulfurized Isobutlyene

The procedure of Example 2 was repeated utilizing the same amount of reactants and solvent but with 242.2 grams of reagent grade n-propanol, 22.8 grams of reagent grade t-butanol. In this run, the reaction mixture was refluxed at 90° C. for 3 hours after the adduct addition was complete. Product made by the foregoing procedure had a viscosity of 9.07 cSt at 100° C., a sulfur content of about 46.2 weight percent, chlorine content of 800 ppm and a CCT of about 40.7 milligrams per 100 mL of sample.

The following Example 7 illustrates the further advantages achieved by utilizing an alcohol or mixture of alcohols having a boiling point above about 85° C. in combination with a catalyst.

EXAMPLE 7

Preparation of Sulfurized Isobutylene

A reaction flask is charged with 174.84 grams of water, 12.45 grams of elemental sulfur, ½ a dropper of antifoam B, 326.72 grams of reagent grade n-propanol, 141.7 grams of 50 weight percent aqueous sodium hydroxide, 369 grams of 35 weight percent aqueous NaHS. The mixture is stirred at 700 rpm and heated under nitrogen to 70° C. at which time 510.2 grams of the isobutylene-sulfur monochloride adduct of Example 1 is added subsurface over a 2 hour period while maintaining the reaction mass at reflux (92°-94° C). Heat is continued at reflux for two hours and then the alcohol is stripped out by heating up to 100° C. at atmospheric pressure. Following the atmospheric strip, the pressure is reduced to 23 inches of Hg while allowing the flask to cool to about 72° C. to complete the removal of the alcohol and most of the water. To the resulting product is added 300 grams of water which, after stirring for 10 minutes is allowed to settle for 5 minutes. The lower aqueous brine layer is separated and the organic layer is vacuum stripped (28 inches Hg) at 100° C. To this product 10 grams KOH dissolved in 300 grams n-propanol, 10 grams of basic alumina, and 20 grams of 300 number molecular weight polyethylene glycol were added and the mixture was refluxed for six hours. To the resulting product is added 200 grams of water which, after stirring for five minutes, is allowed to settle for five minutes. The top aqueous/alcohol layer is separated and the organic layer is vacuum stripped (28 inches Hg) at 100° C. After filtering the stripped organic layer through a bed of diatomaceous earth, a clear yellow oil weighing 315.8 grams was obtained. Sulfurized isobutylene product made by the foregoing procedure had a chlorine content of 114 ppm, a sulfur content of 44.4 wt. %, a viscosity of 11.65 cSt at 100° C., and a CCT of 54.9.

Sulfurized isobutylene products made according to the above Examples 2–7 are given in Table 1.

| Example # | Sulfur (wt. %) | Chlorine (wt. %) | Viscosity (cSt, @ 100° C.) | CCT wt. loss (mg per 100 grams) |
|---|---|---|---|---|
| 2 | 44–47 | 0.7–0.75 | 7.0–8.0 | 35–85 |
| 3 | 43.7 | 0.23 | 6.88 | 37.5 |
| 4 | 45.8 | 0.05 | 7.8 | 45.1 |
| 5 | 45.8 | 0.07 | 8.3 | 42.9 |
| 6 | 46.2 | 0.08 | 9.07 | 40.7 |
| 7 | 44.4 | 0.011 | 11.65 | 54.9 |

EXAMPLE 8

In the next series of runs, various dehalogenation catalysts, catalyst ratios and amounts of reactants were used. For the purposes of this example, all catalyst ratios are given in terms of grams of adduct per gram of catalyst. The reactions were conducted generally in accordance with the procedures of Example 7 with the exception that some of the runs were conducted under aqueous conditions after addition of the dehalogenation catalyst and KOH rather than NaOH was used.

TABLE 2

| Run # | Catalyst (grams) | Co-Catalyst (grams) | Catalyst Ratio (grams/gram) | N-Propanol (grams) | KOH (grams) | Added H₂O (grams) | Na₂S (grams) |
|---|---|---|---|---|---|---|---|
| 1 | Al₂O₃ (basic) | — | 50 | 86 | 10 | 86 | — |
| 2 | Al₂O₃ (acidic) | — | 50 | 86 | 10 | 86 | — |
| 3 | Al₂O₃ (neutral) | — | 53 | 95 | 10 | 95 | — |
| 4 | Al₂O₃ (neutral) | — | 33 | 100 | 15 | — | — |
| 5 | Na-hectorite | — | 50 | 100 | 10 | 80 | — |
| 6 | Ca-hectorite | — | 50 | 100 | 10 | 80 | — |
| 7 | Na-mordenite zeolite | — | 35 | 100 | 20 | 30 | — |
| 8 | Na-hectorite | — | 25 | 100 | 20 | 80 | — |
| 9 | 13X zeolite | — | 33.3 | 100 | 15 | — | — |
| 10 | Y-82 zeolite | — | 50 | 100 | 10 | — | — |
| 11 | Alumina (unactivated) | — | 50 | 100 | 10 | — | — |
| 12 | Na-mordenite zeolite | — | 50 | 300 | 10 | — | 5 |
| 13 | Ca-hectorite | — | 50 | 300 | 10 | — | 5 |
| 14 | Na-mordenite zeolite | 20 | 50 | 280 | 10 | — | — |
| 15 | Na-mordenite zeolite | 20 | 50 | 200 | 10 | 50 | 5 |
| 16 | Na-mordenite zeolite | 20 | 52 | 100 | 10 | 80 | — |
| 17 | Na-mordenite zeolite | 20 | 51 | 280 | 10 | — | 5 |
| 18 | Na-mordenite zeolite | 20 | 50 | 300 | 30 | — | — |
| 19 | Na-hectorite | 20 | 50 | 300 | 20 | — | 3 |
| 20 | Silica gel | — | 49 | 100 | 10 | — | — |
| 21 | Al₂O₃ (neutral) | — | 50 | 100 | 10 | — | — |
| 22 | Al₂O₃ (basic) | — | 50 | 100 | 10 | — | — |
| 23 | Na-mordenite | — | 51 | 100 | 10 | — | — |
| 24 | Al₂O₃ (basic) | — | 25 | 100 | 20 | — | — |
| 25 | Modified clay | — | 50 | 100 | 10 | — | — |
| 26 | Na-mordenite zeolite* | — | 50 | 90 | 10 | — | 3 |

| Run # | Catalyst (grams) | Chlorine (ppm) | Sulfur (wt. %) | Viscosity (cSt, 100° C.) | CCT (mg/100 grams) | Reaction Time (hr) |
|---|---|---|---|---|---|---|
| 1 | Al₂O₃ (basic) | 400 | 45.7 | 7.36 | 49.2 | 6.5 |
| 2 | Al₂O₃ (acidic) | 500 | 45.5 | 7.48 | 44.2 | 6.5 |
| 3 | Al₂O₃ (neutral) | 400 | 45.1 | 8.79 | 44.0 | 6.5 |
| 4 | Al₂O₃ (neutral) | 245 | 45.1 | 8.57 | 67.5 | 6.0 |
| 5 | Na-hectorite | 450 | 45.1 | 7.32 | 42.2 | 6.0 |
| 6 | Ca-hectorite | 500 | 44.2 | 6.79 | 45.1 | 6.0 |
| 7 | Na-mordenite zeolite | 661 | 43.0 | 5.60 | 50.2 | 6.0 |
| 8 | Na-hectorite | 442 | 43.0 | 5.58 | 33.0 | 6.0 |
| 9 | 13X zeolite | 313 | 42.0 | 5.25 | 74.4 | 6.0 |
| 10 | Y-82 zeolite | 413 | 43.4 | 5.46 | 106 | 6.0 |
| 11 | Alumina (unactivated) | 360 | 43.7 | 6.39 | 83.8 | 6.0 |

TABLE 2-continued

| | | | | | | |
|---|---|---|---|---|---|---|
| 12 | Na-mordenite zeolite | 141 | 43.8 | 8.07 | 50.9 | 6.0 |
| 13 | Ca-hectorite | 219 | 42.6 | 6.35 | 43 | 6.0 |
| 14 | Na-mordenite zeolite | 125 | 44.7 | 6.60 | 36.8 | 7.0 |
| 15 | Na-mordenite zeolite | 254 | 44.3 | 6.11 | 50.7 | 7.0 |
| 16 | Na-mordenite zeolite | 334 | 46.3 | 6.73 | 50.3 | 6.0 |
| 17 | Na-mordenite zeolite | 126 | 43.3 | 5.85 | 57.3 | 6.5 |
| 18 | Na-mordenite zeolite | 102 | 40.4 | 4.85 | 44.6 | 6.0 |
| 19 | Na-hectorite | 72 | 41.0 | 4.64 | 12.8 | 6.0 |
| 20 | Silica gel | 500 | 43.0 | 5.55 | 107.0 | 6.0 |
| 21 | $Al_2O_3$ (neutral) | 800 | 44.5 | 6.57 | 89.2 | 2.0 |
| 22 | $Al_2O_3$ (basic) | 500 | 45.4 | 6.93 | 74.5 | 6.0 |
| 23 | Na-mordenite | 221 | 42.7 | 5.50 | 102.0 | 6.0 |
| 24 | $Al_2O_3$ (basic) | 253 | 42.1 | 5.11 | 78.3 | 7.0 |
| 25 | Modified clay | 412 | 43.9 | 5.83 | 94.2 | 6.0 |
| 26 | Na-mordenite zeolite* | 444 | 43.5 | 5.62 | 96.8 | 6.0 |

*Also includes 10 grams of t-butanol

For the copper corrosion test (CCT) weight loss analysis a weighed copper strip is immersed in the sulfurized olefinic product of this invention for three hours at 121° C. The corrosion scale is removed using 10 percent sodium cyanide solution and the copper strip is re-weighed to determine the weight loss. An acceptable CCT weight loss is within the range of 20 to 100 with 30 to 70 milligrams per 100 grams of sample tested being more typical of acceptable sulfurized olefinic products.

The sulfurized olefins of the invention are especially useful as extreme pressure additives for lubricating oil formulations, especially in gear applications. The base oils can be of mineral or synthetic origin. Synthetic oils include, in particular, olefin oligomers such as decene trimer, tetramer and pentamer made by oligomerizing 1-decene using a $BF_3$ catalyst. Useful olefin oligomers can be made using other catalysts such as the aluminum alkyl Ziegler catalyst. Likewise, other olefins can be used such as $C_{6-14}$ 1-olefins.

In this application, the sulfurized olefinic products of the invention are added in amounts sufficient to improve the extreme pressure property of the lubricant. Amounts of from 0.2 to 10.0 weight percent based on the total weight of the additized lubricant are usually sufficient.

These additives can be used in combination with other conventional additives which perform various functions. Examples of such other additives are corrosion inhibitors for ferrous and non-ferrous metals such as tetrapropenyl succinic acid and bis(2,5-alkyldithio)-1,3,4-thiadiazoles as well as antiwear additives such as alkyl or aryl phosphonates, phosphites, thiophosphates, dithiophosphates, and phosphoric acids. Also zinc dialkyl or diaryl dithiophosphate, chlorinated hydrocarbo sulfurized fatty esters and amines can be added.

Variations in the invention are within the spirit an scope of the appended claims.

What is claimed is:

1. A process for preparing, in high yield, a sulfurized olefinic product having a chlorine content of less than about 1000 ppm, a sulfur content of more than about 30 weight percent, and a viscosity within the range of from about 5 to about 15 cSt at 100° C. comprising:

a) contacting an adduct of (i) a sulfur halide and (ii) an olefin with a sulfur source in an alkaline reaction medium comprising base, a catalytic amount of dehalogenation catalyst selected from the group consisting of silica, alumina, clays, modified clays, zeolites, modified zeolites, and $TiO_2$, and a lower alkanol, said alkanol having a boiling point of greater than about 85° C.;

b) maintaining the so contacted adduct at a temperature and for a period of time which are sufficient to form a mixture containing alcohol, base, and a sulfurized olefinic product; and c) heating the mixture for a period of time and at a temperature and pressure which are sufficient to form, in high yield, the sulfurized olefinic product having a chlorine content of less than about 1000 ppm, and a viscosity of within the range of from about 5 to about 15 cSt at 100° C.

2. The process of claim 1 wherein the temperature of step (b) is in the range of from about 90° C. to reflux.

3. The process of claim 1 wherein the sulfur source is selected from S, NaHS, and a mixture of S and NaHS.

4. The process of claim 1 wherein the dehalogenation catalyst is selected from the group consisting of alumina, clays, modified clays, zeolites, and modified zeolites.

5. The process of claim 1 wherein the lower alkanol is n-propanol, or a mixture of n-propanol and t-butanol.

6. The process of claim 1 wherein the alkaline reaction medium further comprises a catalytic amount of polyalkylene glycol co-catalyst having a number average molecular weight within the range of from about 250 to about 350.

7. The process of claim 1 wherein the weight ratio of adduct to dehalogenation catalyst is within the range of from about 20:1 to about 75:1.

8. The process of claim 1 wherein the lower alkanol is n-propanol or a mixture of n-propanol and t-butanol, and wherein the weight ratio of alcohol to adduct is in the range of from about 0.15:1 to about 0.65:1.

9. The process of claim 8 wherein the alcohol is comprised of essentially pure n-propanol.

10. The process of claim 1 wherein the reaction medium further comprises water.

11. The process of claim 1 wherein the olefin is isobutylene.

12. The process of claim 8 wherein the alkaline reaction medium further comprises a catalytic amount of a polyalkylene glycol co-catalyst.

* * * * *